J. W. HASBURG.
RANGE FINDER FOR AIR CRAFT.
APPLICATION FILED DEC. 8, 1914.
1,152,946.
Patented Sept. 7, 1915.
4 SHEETS—SHEET 1.
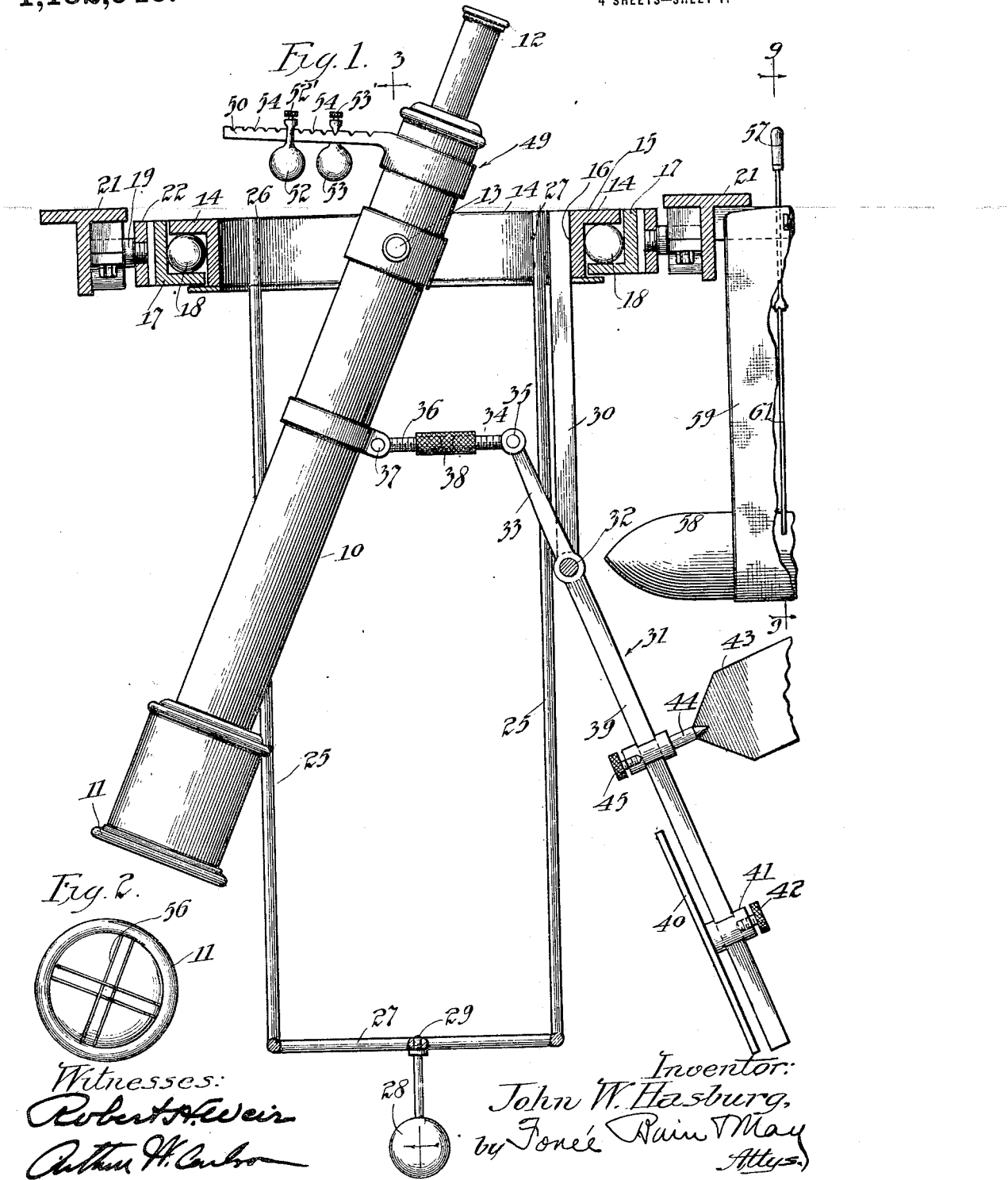

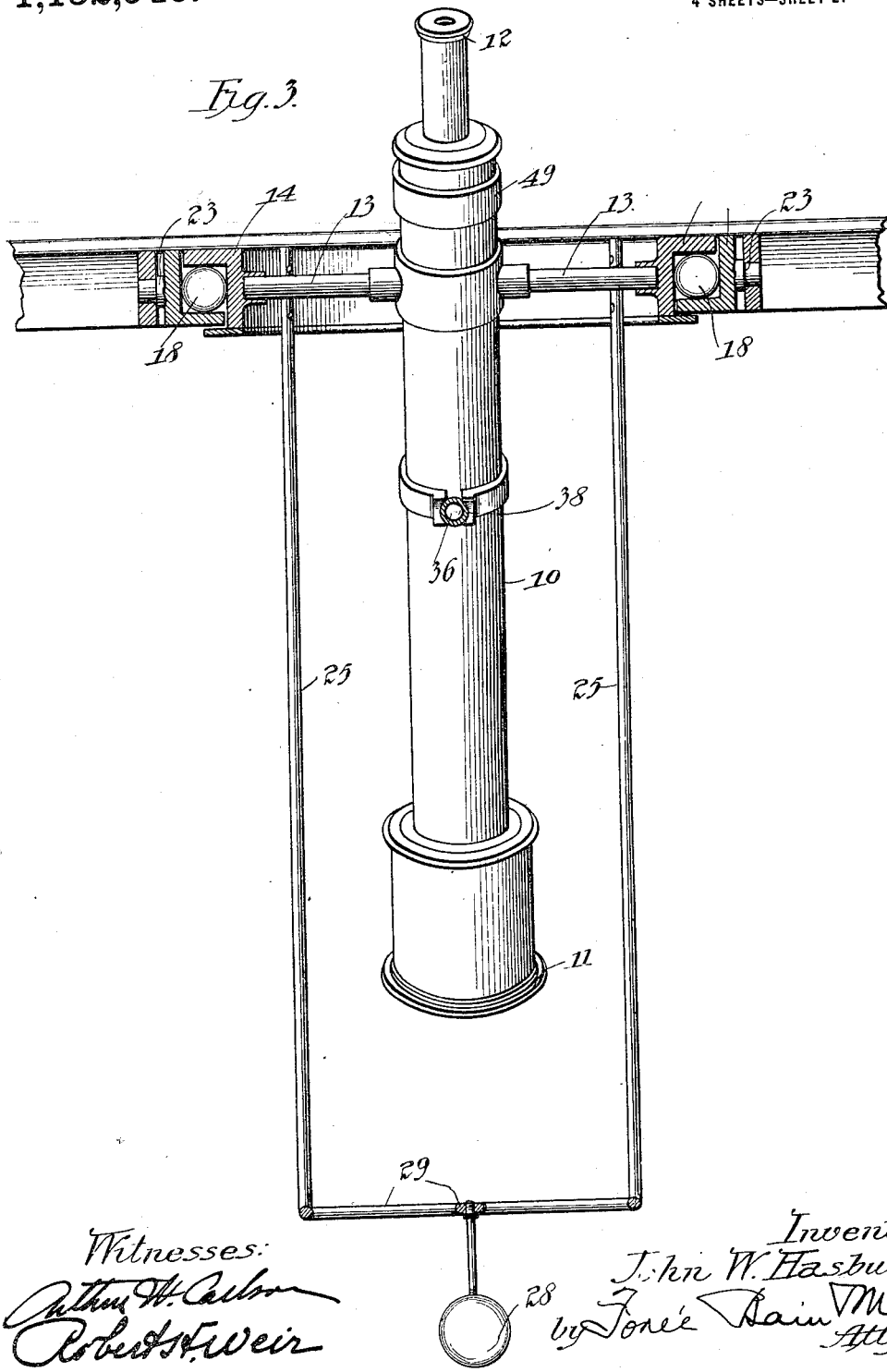

J. W. HASBURG.
RANGE FINDER FOR AIR CRAFT.
APPLICATION FILED DEC. 8, 1914.
1,152,946.
Patented Sept. 7, 1915.
4 SHEETS—SHEET 3.
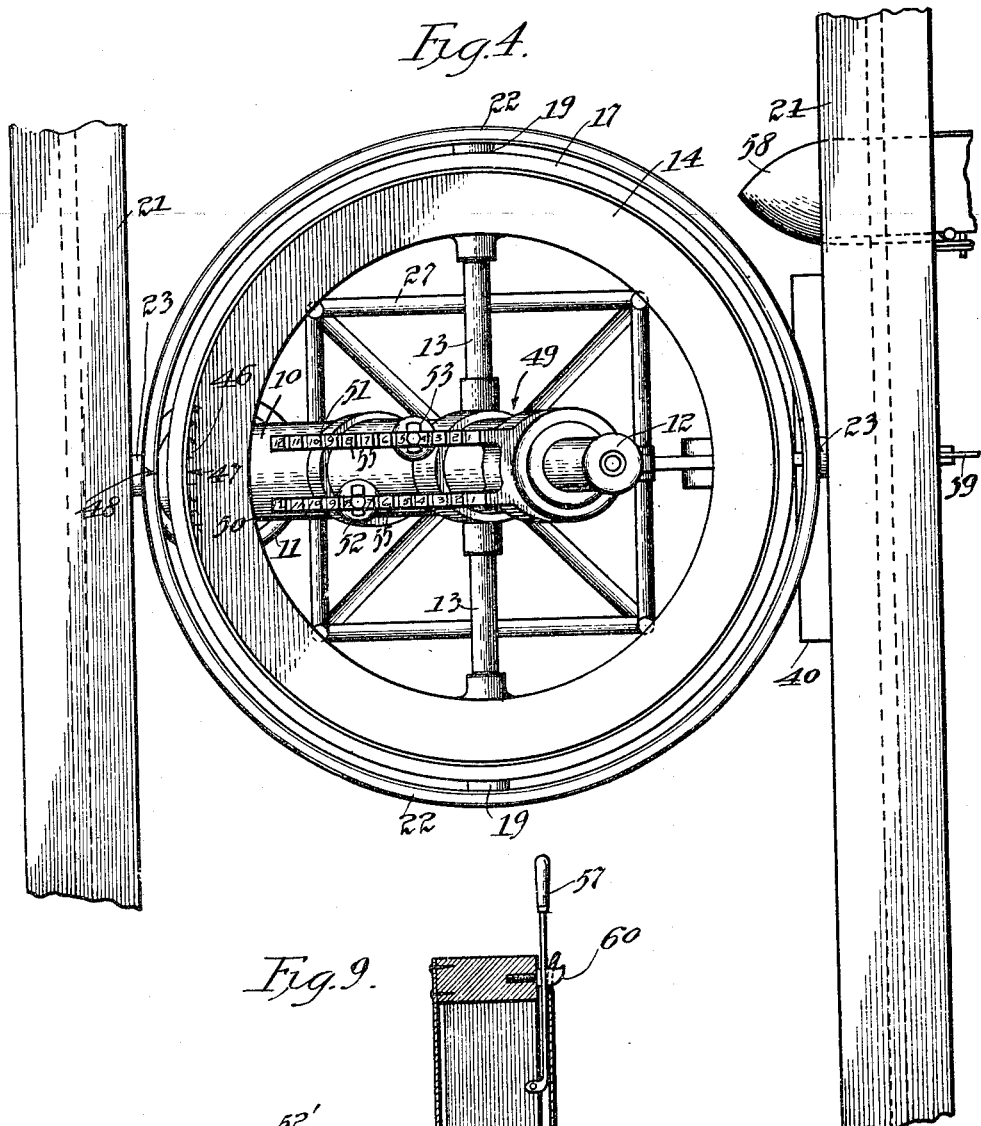
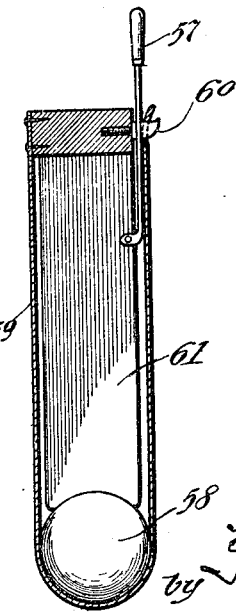
Witnesses:
Inventor:
John W. Hasburg,

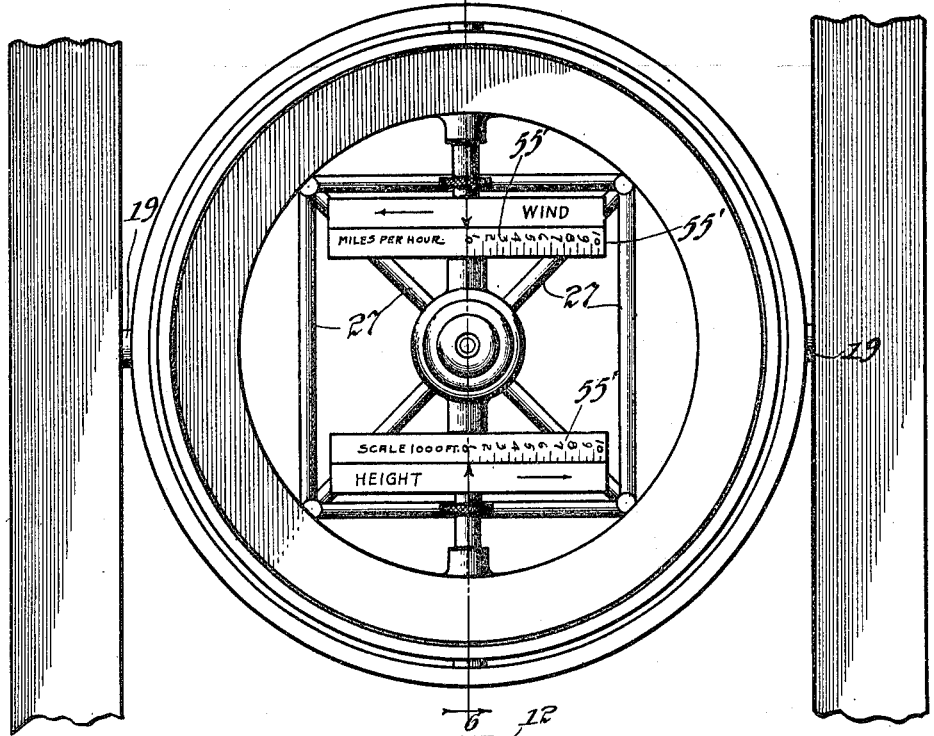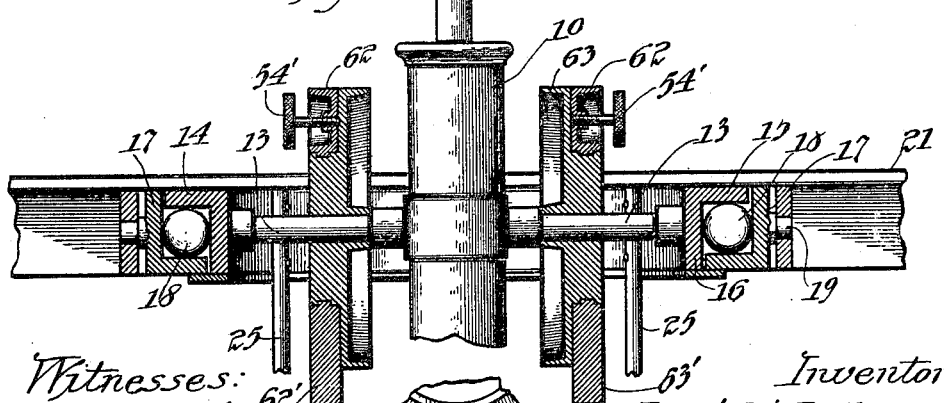

UNITED STATES PATENT OFFICE.

JOHN WILLIAM HASBURG, OF CHICAGO, ILLINOIS.

RANGE-FINDER FOR AIR-CRAFT.

1,152,946.  Specification of Letters Patent.  Patented Sept. 7, 1915.

Application filed December 8, 1914. Serial No. 876,089.

*To all whom it may concern:*

Be it known that I, JOHN W. HASBURG, a citizen of the United States, residing at Chicago, in the county of Cook and State of Illinois, have invented certain new and useful Improvements in Range-Finders for Air-Craft, of which the following is a specification.

My invention relates to improvements in range finders for air crafts.

One of the salient objects of my invention is to provide an instrument, of the character to be hereinafter described, to be mounted upon an air craft whereby an observer in said craft may determine the proper time when to release a bomb, projectile or other missile to strike a given object below.

A specific object of my invention is the provision of automatic means to position the instrument, by the use of which observations are to be made, to compensate for altitude, wind pressure, wind direction and speed of the craft.

When a bomb or similar missile is dropped from an aeroplane or dirigible machine with a view of striking an object below it must travel the intervening distance in a path determined by several variable factors. The projectile, in its downward course, will never travel in a true vertical plane, but will describe a curve, the characteristic or shape of which will be influenced by the velocity the missile has acquired before it leaves the machine, or the speed at which the machine is moving, at the time when said missile is released. The missile must therefore be released before the machine reaches a point immediately above the object aimed at. Compensation must also be made for altitude of the machine and the velocity and direction of the wind in order that the projectile, or other missile, may find its target.

In carrying my invention into effect I provide means for automatically compensating for the velocity or speed at which the machine is traveling and means automatically to indicate the direction of the wind and convenient means for calibrating the instrument for altitude and relatively larger changes in wind velocity, or pressure, immediately prior to the time when observations are to be made and the missile is to be dropped.

Other and further objects of my invention will become readily apparent to persons skilled in the art from a consideration of the following description when taken in conjunction with the drawings wherein—

Figure 1 is a side elevation of the apparatus, showing parts in section. Fig. 2 is an end view of the observation instrument or sighting structure showing the cross lines defining the zone within which the object must appear. Fig. 3 is a section taken on line 3—3 of Fig. 1. Fig. 4 is a plan view of the instrument. Fig. 5 is a plan view of a modification. Fig. 6 is a transverse section taken on line 6—6 of Fig. 5. Fig. 7 is a fragmentary side elevation of a portion of a weighted adjustment ring. Fig. 8 is an elevation of one of the calibrating weights shown in Fig. 4. Fig. 9 is a sectional view of means for holding a missile and means for releasing the same, taken on line 9—9 of Fig. 1.

In all the views the same reference characters are employed to indicate similar parts.

In the single embodiment which I have illustrated for a clear disclosure of my invention, an observation tube 10, which may be a telescope, by which the images are magnified, or a simpler sighting structure through which observation may be made, is provided with an objective end 11 and an eye piece 12. These parts may or may not be longitudinally adjustable, with reference to the central body portion 10 if the instrument is of the magnifying character, for the purpose of adjusting it for focus. The tube or telescope is pivoted, as at 13—13, to a ring 14. The ring is angular in cross section, having one longitudinally disposed annulus 15 and a vertically disposed integral annulus 16. The ring 14 is supported in a similar but larger ring 17 of substantially the same cross section but reversed with reference to the relative positions of the integral parts. The ring 14 rests upon anti-friction ball bearings, composed of balls 18, that are located in the annular space between the respective rings 14 and 17. The outer ring 17, within which the ring 14 is freely revoluble, is pivoted to another ring 22 on opposite sides of the diameter as at 19—19. The ring 22 is pivoted at diametrically opposite points to relatively stationary members 21, 21, as at 23—23.

Four vertically disposed and quadrilaterally arranged rods 25 are secured to the inner ring 14, as at 26, and cross bars 27 are secured to the bottom ends of the respective vertically disposed rods to provide a frame, to the center of which a pendulous weight 28 is attached, as at 29. The pendulous weight 28 is secured to the frame directly under the center of the axis 13—13 of the telescope 10, so that if the telescope were not affected by other influences it would hang in a truly vertical plane, independently of the relative position of the frame members 21 by which the instrument is supported and thus the equilibrium of the instrument is established and maintained.

Depending from the inner ring 14 is an arm 30, to which a lever 31 is pivoted, as at 32. A relatively short member 33, of the lever 31, projects above the pivotal point 32 and is connected to one end of a variable link 34, as at 35. The other end of the link 36 is pivotally connected to the tube 10, as at 37. The members 34 and 36 are screw threaded, one bearing a right hand thread and the other a left hand thread so that the threaded nut 38, when turned upon the respective arms 34 and 36 will vary the distance between the pivotal points 35 and 37, as one means for calibrating the instrument.

To the lower member 39, of the lever 31, is attached a plate or plane 40 longitudinally adjustable thereon by means of the stud 41 and the knurled screw 42, whereby the plane may be longitudinally moved upon the lever 39 and secured in adjusted position by the screw 42. If the lower end of the lever 39 be moved to the right, as by air pressure, the tube 10, will, as a result of its connection therewith, be moved relatively to the left of a line drawn through the vertical axis of said tube, so that the pressure of air that impinges upon the plane 40, as a result of wind and the velocity of the air craft upon which the instrument is supported, will have the effect of deflecting the lower end of the tube 10 laterally and forwardly from a true vertical position substantially proportional to the velocity of the machine, or craft, upon which the instrument is borne and the movement of air through which it is passing.

A vane 43, consisting of a relatively thin sheet of material, such as metal, is secured to a stud 44 that is adjustably supported upon the lever 39 by means of a knurled screw 45. The vane 43 will arrange itself parallel with a current of air through which the machine is passing and will thereby be deflected from its true normal position when the machine is moving in a plane at an angle thereto; the movement of which will rotate the ring 14 and the tube 10 connected thereto. The extent to which they are thus rotated will be indicated on the scale 46, of the ring 14, which carries a central pointer 47, which coöperates with the relatively stationary pointer 48, upon the outer ring 22, so that the extent or degree, to which the inner ring and parts carried thereby are deflected by the vane 43, may be readily indicated, and when the craft bearing the instrument, is turned directly into the wind the vane 43 will bring the pointer 47 back into the same plane as the pointer 48, which operation will indicate to the operator that the craft is sailing directly into the wind.

It will now be understood that the pressure produced by the impingement of air or wind upon the plane 40 has the effect to deflect the telescope 10 from a true vertical plane, substantially proportional to the pressure exerted thereby upon it and the vane 43 will rotate the telescope 10, mounted upon the supporting ring 14, so that the telescope will always point directly into the wind irrespective of the direction in which the air craft is moving. These two movements of the telescope 10 are automatic and are effected independently of the operator. The angular position of the telescope 10, with reference to the true vertical position, must be determined, to some extent, by the altitude of the air craft. The lower the craft the greater must be the deflection of the telescope from the true vertical plane, and therefore to compensate for altitude I provide a calibrating device by means of which the instrument is to be calibrated for the altitude of the craft or aeroplane and for the velocity at which the wind is moving relative to the craft. To this end I arrange as the simplest form the device may take, a bifurcated arm structure 49, consisting of the members 50 and 51. Each arm carries an adjustable weight 52 and 53, respectively, and each arm is provided with a series of notches 54 and corresponding graduations 55. The graduations of each of the arms 50 and 51, begin at their inner ends and are numbered consecutively from 1 to 12 progressing numerically toward the free ends thereof.

In the use and operation of the device, the operator, after ascertaining the relative speed of the wind, with reference to the movement of the craft, will place the weight 53 in the suitable notch on the lever and secure it with the appropriate screw. If he finds the wind to be 30 miles per hour he will place the weight in the notch 3. He will carry a barometer which will indicate the altitude of the machine and if he finds that it is 4,000 feet he will place the weight 52 in the notch corresponding with the numeral 4 and secure it with the screw 52' thereby calibrating the apparatus for altitude and relatively large changes in wind pressure. With a higher relative velocity of wind, or with greater altitude he will place each of the weights 52 and 53 farther from the telescope structure so as to thereby automatically change the angularity of the telescope from a true vertical plane corresponding with the conditions mentioned. Preparatory to releasing the bomb the operator will so change the direction of his air craft that the indicator point 47 will be just opposite the stationary point 48 at which time the wind resistance is directly in front of him. He will now place his eye near the eye piece 12, of the telescope, and when the object or target, which he desires to hit with the bomb, is within the zone between the cross bars or cross lines 56—56 of the objective end 11 he will move the lever 57 outwardly so as to release the bomb 58. The bomb 58 is shown conventionally, being held supported by a fabric 59 which passes around the bomb and which is provided with an aperture that passes over the stud 60, and when the lever 57 is pushed outwardly the fabric is moved free of the stud 60 and the bomb 58 will then drop. A blade 61 is provided against which the bomb 58 is brought into contact to prevent the bomb from falling when the latch on the stud 60 is engaged with the fabric.

In Figs. 5, 6 and 7 is shown a modification of the calibrating apparatus which I have just described. In the modification the weights 62' and 63' are each attached to one side of a rotatable ring 62 which is held in adjusted position by means of screws 54' upon a disk 63, that is mounted upon the axis 13 on each side of the telescope tube. The scales 55' are numbered substantially the same as that on the arms 50 and 51 of the device, shown in Fig. 4. The movement of the ring 62 around the axis 13 of the telescope places the weight 62' or 63', as the case may be, farther from the vertical plane through the transverse axis of the telescope, just as the movement of the weights 52 and 53 upon the arms 50 and 51 accomplish the same result.

After a missile has been dropped in obedience to the calibration and indications of the instrument, the objective point and the missile may be observed, and if it has missed the target by striking a point short of the target or beyond it, the calibration of the instrument may be thereafter correspondingly varied or readjusted and the operator may then turn the craft and cause it to pass again over the same path and drop another bomb in accordance with the indications resulting from the new adjustment to be observed through the instrument. Preserving the calibration from the first effort and knowing the distance that the first missile struck the earth's surface prematurely or at a delayed time with reference to the target it is within the range of probability that the second effort will be more successful. Substantially the same method used with this instrument, is pursued in connection with the use of range finders for high powered guns or cannons, the first shot serving as a guide, according to which the range finder is to be adjusted in order that the subsequent efforts may be closer the mark.

While I have herein shown a single embodiment of my invention for the purpose of clear disclosure, it is evident that considerable change may be made in the construction, formation and disposition of parts within the scope of the appended claims.

Having described my invention, what I claim is:—

1. In a device of the character described, the combination of a sighting structure, a pivotal mounting therefor, a pivoted air pressure responsive wing, a connection between the wing and the sighting structure, and adjustable means for varying the distance between the wing and its pivot.

2. In a device of the character described, the combination of a sighting structure, a universal mounting therefor, an air pressure responsive wing, a connection between the said wing and sighting structure for moving the latter in a vertical plane in response to wing movement, and a second air pressure responsive wing connected with the sighting structure and adapted to move the same about a vertical axis.

3. In a device of the character described, the combination of a sighting structure, a pivotal mounting therefor, a pivoted air pressure responsive wing, a connection between the wing and the sighting structure, and adjustable means resisting the movement of the sighting structure.

4. In a device of the character described, the combination of a sighting structure, a universal mounting therefor, an air pressure responsive wing, a connection between the said wing and sighting structure for moving the latter in a vertical plane in response to wing movement, adjustable means resisting the movement of the sighting structure in a vertical plane, and a second air pressure responsive wing connected with the sighting structure and adapted to move the same about a vertical axis.

5. In a device of the character described, the combination of a sighting structure, a pivotal mounting therefor, a pivoted air pressure responsive wing, a connection between the wing and the sighting structure, and two separate and independently adjustable means resisting the movement of the sighting means.

6. In a device of the character described, a telescope; a ring to which said telescope is diametrically pivoted; another ring surrounding the first mentioned ring similarly pivoted to a relatively fixed structure, at right angles to the first named pivot; a fixed structure; ball bearings between the ring;

a pendant weight carried by said first mentioned ring to maintain the equilibrium of the telescope, and a plane responsive to air pressure, for moving said telescope on its pivots.

7. In a device of the character described, a telescope; a ring to which said telescope is diametrically pivoted; another exterior ring similarly pivoted to a relatively fixed structure, at right angles to the first named pivots; a fixed structure; ball bearings between the said rings to reduce the friction; a pendant weight connected to said first mentioned ring; a plane responsive to air pressure for moving said telescope on its pivot away from its vertical axis and a vane responsive to relative direction of air for rotatively moving said telescope around its vertical axis.

In testimony whereof I hereunto set my hand in the presence of two subscribing witnesses.

JOHN WILLIAM HASBURG.

In the presence of—
 FORÉE BAIN,
 MARY F. ALLEN.